United States Patent
Ishida et al.

(10) Patent No.: US 8,337,728 B2
(45) Date of Patent: Dec. 25, 2012

(54) METHOD FOR PRODUCING AN OPTICAL FILTER

(75) Inventors: Tatsuya Ishida, Tokyo (JP); Koichi Shigeno, Tokyo (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/442,394

(22) Filed: Apr. 9, 2012

(65) Prior Publication Data

US 2012/0193588 A1   Aug. 2, 2012

Related U.S. Application Data

(63) Continuation of application No. 12/444,333, filed as application No. PCT/JP2007/073556 on Dec. 6, 2007, now abandoned.

(30) Foreign Application Priority Data

Dec. 15, 2006  (JP) ................. 2006-338863

(51) Int. Cl.
   *G02B 5/23*   (2006.01)
   *G02F 1/1335*   (2006.01)
   *C04B 33/00*   (2006.01)

(52) U.S. Cl. ............ 252/586; 349/106; 427/162; 430/7; 501/141; 524/104; 548/455

(58) Field of Classification Search ................. 252/586; 349/106; 427/162; 430/7; 501/141; 524/104; 548/455

See application file for complete search history.

(56) References Cited

U.S. PATENT DOCUMENTS

| 5,160,371 | A | 11/1992 | Ito |
| 6,775,059 | B2 | 8/2004 | Kuwabara |
| 2002/0127395 | A1 | 9/2002 | Kuwabara |
| 2005/0008969 | A1 | 1/2005 | Miyako et al. |
| 2005/0040378 | A1 | 2/2005 | Kobayashi et al. |
| 2005/0163958 | A1 | 7/2005 | Nakatsugawa |
| 2006/0073407 | A1 | 4/2006 | Yamanobe et al. |
| 2008/0125524 | A1* | 5/2008 | Ishida et al. ............ 524/104 |

FOREIGN PATENT DOCUMENTS

| CN | 1576906 | 2/2005 |
| CN | 1616995 | 5/2005 |
| CN | 1714126 | 12/2005 |
| JP | 02-293315 | 12/1990 |
| JP | 10-077427 | 3/1998 |
| JP | 10-133013 | 5/1998 |
| JP | 10-180922 | 7/1998 |
| JP | 2002-200711 | 7/2002 |
| JP | 2003-082302 | 3/2003 |
| JP | 2003-021715 | 1/2004 |
| JP | 2004-002491 | 1/2004 |
| JP | 2004-053799 | 2/2004 |
| JP | 2004-107566 | 4/2004 |
| JP | 2005-049847 | 2/2005 |
| JP | 2005-134639 | 5/2005 |
| JP | 2005-331545 | 12/2005 |
| JP | 2006-201238 | 8/2006 |
| JP | 2007-233323 | 9/2007 |
| JP | 2007-279676 | 10/2007 |
| WO | WO 2006/137272 | 12/2006 |
| WO | WO 2008/004611 | 1/2008 |

OTHER PUBLICATIONS

Chinese Application dated Mar. 1, 2010, Application No. 200780037092.9.
Chinese Official Action, 200780037092.9 Sep. 15, 2010.

* cited by examiner

*Primary Examiner* — Bijan Ahvazi
(74) *Attorney, Agent, or Firm* — Young & Thompson

(57) ABSTRACT

An optical filter containing at least a clay mineral complex (A). The clay mineral complex (A) comprises a layered clay mineral (B) intercalated with a dye cation (C), and an organic cation (D).

5 Claims, No Drawings

METHOD FOR PRODUCING AN OPTICAL FILTER

CROSS REFERENCE TO RELATED APPLICATIONS

This application is a continuation of co-pending application Ser. No. 12/444,333 filed on Apr. 3, 2009, which is a national stage of PCT/JP2007/073556 filed on Dec. 6, 2007, which claims foreign priority to Japanese Application No. 2006-338863 filed on Dec. 15, 2006. The entire content of each of these applications is hereby expressly incorporated by reference.

TECHNICAL FIELD

This invention relates to an optical filter containing an inorganic/organic complex having a layered clay mineral intercalated with dye cations and organic cations and optionally containing a binder resin. The optical filter is specially suited for application to image displays.

BACKGROUND ART

Compounds having an intense absorption of specific wavelengths of light are used in a recording layer of optical recording media, such as CD-Rs, DVD-Rs, DVD+Rs, and blue laser recording discs, and an optical element of image displays, such as liquid crystal displays (LCDs), plasma display panels (PDPs), electroluminescence displays (ELDs), cathode ray tubes (CRTs), vacuum fluorescent displays (VFDs), and field emission displays (FEDs).

The optical element of an image display is exemplified by a light absorber used in a color filter having a substrate and color pixels formed on the substrate and transmitting white light to convert a monochromatic display to a color display. An image display achieves a full color display using combinations of three primary colors of light, red, blue, and green. Light for displaying a color image contains a component that causes display quality reduction, such as light rays between green and red (550 to 600 nm) and a component that causes malfunction of an infrared remote controller (750 to 1100 nm). On the other hand, it is required with an image display that the unnecessary light component be selectively absorbed by an optical filter to achieve a color display or to eliminate the malfunction of an infrared remote controller. Absorption of light with wavelengths of from 480 to 500 nm and of from 540 to 560 nm is also demanded in order to prevent reflection of ambient light, such as a fluorescent lamp. Then, an image display is equipped with an optical filter containing a light absorbing compound (light absorber) capable of selectively absorbing light of the wavelengths recited separately from the color filter.

A conventional optical filter is manufactured by affixing an optical film containing a light absorbing compound (light absorber) capable of selectively absorbing specific wavelengths of light to a transparent substrate, such as a glass plate, via a pressure-sensitive adhesive. Thus, there have been problems of high cost due to many steps involved in the manufacture and difficulty in reducing the thickness of the optical filter.

Patent Document 1 discloses a film for an electronic display, the pressure sensitive adhesive layer of which film contains a dye and carbon black. Patent Document 2 discloses a pressure-sensitive adhesive containing a dye. Patent Document 3 proposes a filter for a display, the pressure sensitive adhesive layer of which contains a dye.

It is difficult, however, to control deterioration of a dye compound in an adhesive layer caused by light, heat or the like. An optical filter that maintains sufficient optical characteristics is not available to date.

Patent Document 4 discloses an aqueous ink containing a colorant having clay intercalated with a dye. Patent Document 5 discloses a clay mineral complex having a layered clay mineral intercalated with organic cations and an intercalant. Patent Document 6 discloses a fluorescent layered inorganic/organic complex of an anion-exchanging, inorganic layer compound having carried thereon an aliphatic quaternary ammonium ion and an anionic laser dye. These patent documents are silent to applying the colorant or the colored complex to an optical filter or improving moist heat resistance of an optical filter by using the colorant or the clay mineral complex.

Patent Document 1: JP 2003-82302A
Patent Document 2: JP 2004-107566A
Patent Document 3: Japanese Patent 3311720
Patent Document 4: JP 10-77427A
Patent Document 5: JP 2-293315A
Patent Document 6: JP 2004-2491A

DISCLOSURE OF THE INVENTION

Problem to be Solved by the Invention

Applicant has filed an application for patent on an invention relating to an optical filter containing a mixture of a dye compound and a layered clay mineral (WO2006/137272A1).

When the mixture of the dye compound and the layered clay mineral is used in an optical filter as such without being once isolated as a clay mineral complex and dried, the resulting optical filter contains an organic solvent-insoluble component, such as a quaternary ammonium salt, which can reduce moist heat resistance of the filter. Furthermore, ion exchange of the interlayer organic cations of a layered clay mineral with dye cations is less likely to take place, raising the need to increase the amount of the layered clay mineral to be used. This results in thickening a coating composition, flocculation of the clay mineral complex particles, or increasing the cost.

Accordingly, an object of the invention is to provide an optical filter exhibiting high resistant against light and moist heat even in its pressure-sensitive adhesive layer.

Means for Solving the Problem

As a result of extensive investigation, the inventors have found that the above object is accomplished by using a clay mineral complex comprising a layered clay mineral having dye cations and organic cations intercalated therein particularly in a pressure-sensitive adhesive layer of an optical filter.

Based on the above finding, the invention provides an optical filter containing at least a clay mineral complex (A). The clay mineral complex (A) comprises a layered clay mineral (B) intercalated with a dye cation (C) and an organic cation (D).

BEST MODE FOR CARRYING OUT THE INVENTION

The optical filter according to the invention will be described with reference to its preferred embodiments.

The optical filter of the invention contains at least a clay mineral complex (A). The clay mineral complex (A) comprises a layered clay mineral (B) intercalated with a dye cation (C) and an organic cation (D).

The layered clay mineral as component (B) may be a naturally occurring substance, a chemically synthesized product, a clay mineral containing lithium, sodium, calcium, or like ions between its layers, or a substitution product or a derivative or a mixture of these substances. Examples of the layered clay mineral (B) include smectite minerals, kaolin minerals, mica minerals, talc, chlorite, hydrotalcite, vermiculite, and fluorovermiculite. Examples of the smectite minerals include hectorite, saponite, stevensite, beidellite, montmorillonite, bentonite, and nontronite. Examples of the kaolin minerals include kaolinite, halloysite, nacrite, dickite, chrysotile, lizardite, amesite, and pyrophyllite. Examples of the mica minerals include Li-fluoro-taeiniolite, Na-fluoro-taeiniolite, and synthetic Na-tetrasilicic fluoromica. Among them, smectite minerals and mica minerals are preferred because of their high functionality.

Preferred of the smectite minerals are those having been purified to be free from impurities. Still preferred are lipophilic smectite having high affinity to polymer binders and organic solvents. The lipophilic smectite is obtained by lipophilizing the recited smectite mineral with, e.g., quaternary ammonium ions. Accordingly, in the cases where a lipophilic smectite is used, the organic cation hereinafter described as component (D) already exists in the lipophilic smectite as an interlayer cation.

Commercially available products may be used as smectite, including Lucentite SWN and SWF (hydrophilic smectite, available from CO-OP Chemical Co., Ltd.); Lucentite STN, STN-A, SPN, SEN, SAN, SAN2C, SAN210, STF, SSN, SSN-A, SAN312-A, SAN2C-A, and SAN210-A (lipophilic smectite, from CO-OP Chemical Co., Ltd.); Kunipia T (montmorillonite, from Kunimine Industries Co., Ltd.); S-Ben N-400 and N-400FP (montmorillonite, from Hojun Co., Ltd.); and Benton (from Toshin Chemicals Co., Ltd.). Preferred among them are STN-A, SSN-A, SAN210-A, SAN-312-A, and SAN2C each of which has been purified to be freed from impurities because they are less likely to flocculate when formulated into a clay mineral complex and therefore exhibit good dispersibility.

Preferred of the mica minerals are those having been purified to be free from impurities. Swellable mica minerals having high affinity to polymer binders and organic solvents are still preferred.

The mica mineral may be a commercially available product, which includes Somacif (swellable mica, available from CO-OP Chemical Co., Ltd) and Micromica (non-swellable mica, from CO-OP Chemical Co., Ltd.).

The dye cation as component (C) may be a cation of any known compound that has been used in conventional optical filters, such as a cyanine compound. A cation of a single species or a combination of cations of two or more species can be used.

Examples of the dye cation (C) include those of cyanine compounds, diimmonium compounds, aminium compounds, metal salts of azo compounds, azomethine dye compounds, triarylmethane dye compounds, naphthalimide compounds, naphtholactam compounds, oxazine compounds, thiazine compounds, azaxanthene compounds, quinoline compounds, indamine dye compounds, rhodamine dye compounds, squarylium compounds, and styryl dye compounds. In particular, a cation of a cyanine compound and a cation of a diimmonium compound are preferred; for a clay mineral complex having the cation intercalated therein is not easily susceptible to the influence of external factors, such as ultraviolet light and moisture, and therefore exhibits high resistance to light and moist heat. Furthermore, the clay mineral complex having the cation of a cyanine compound or a diimmonium compound has high affinity to an organic solvent with low polarity. Two or more kinds of the dye cations may be used as component (C).

The cyanine compound providing a cation is exemplified by a compound represented by general formula (I):

[Formula 1]

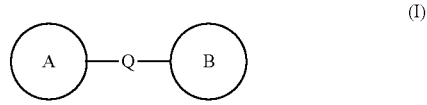

(I)

wherein ring A is a group represented by structural formula (a), (b), or (d); ring B is a group represented by structural formula (b) or (c); and Q is a polymethine linking group, the polymethine chain of which may contain a ring structure and may have its hydrogen atom substituted with a halogen atom, a cyano group, a hydroxyl group, an alkyl group, an alkoxy group, or an aryl group, these groups may be further substituted.

[Formula 2]

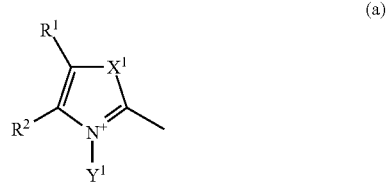

(a)

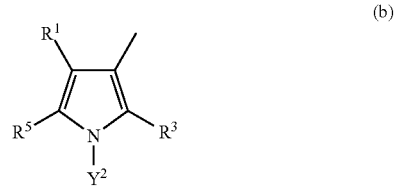

(b)

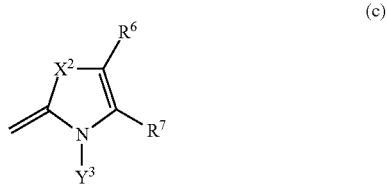

(c)

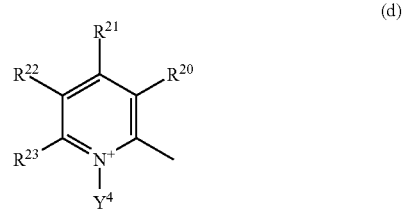

(d)

wherein $R^1$, $R^2$, $R^3$, $R^4$, $R^5$, $R^6$, $R^7$, $R^{20}$, $R^{21}$, $R^{22}$, and $R^{23}$ each represent a hydrogen atom, a hydroxyl group, a substituted or unsubstituted alkyl group having 1 to 8 carbon atoms, a substituted or unsubstituted alkoxy group having 1 to 8 carbon atoms, a substituted or unsubstituted aryl group having 6 to 30 carbon atoms, a substituted or unsubstituted aralkyl group having 7 to 30 carbon atoms, a halogen atom, a nitro group, a cyano group, or a substituent represented by general formula (II) below; $R^1$ and $R^2$, $R^4$ and $R^5$, $R^6$ and $R^7$, $R^{20}$ and $R^{21}$, $R^{21}$ and $R^{22}$, or $R^{22}$ and $R^{23}$ may be connected to each other to form a carbocyclic or heterocyclic ring having 3 to 12 carbon atoms; $X^1$ and $X^2$ each represent an oxygen atom, a sulfur atom, a selenium atom, —$CR^8R^9$—, —NH—, or —$NY^a$—; $R^8$ and $R^9$ each represent a substituted or unsubstituted alkyl group having 1 to 8 carbon atoms, a substituted or unsubstituted aryl group having 6 to 30 carbon atoms, a substituted or unsubstituted aralkyl group having 7 to 30 carbon atoms, a substituent represented by general formula (II) below, or a substituent represented by general formula (III) below; $Y^a$, $Y^1$, $Y^2$, $Y^3$, and $Y^4$ each represent a hydrogen atom, a substituted or unsubstituted alkyl group having 1 to 8 carbon atoms, a substituted or unsubstituted alkoxy group having 1 to 8 carbon atoms, a substituted or unsubstituted aryl group having 6 to 30 carbon atoms, a substituted or unsubstituted aralkyl group having 7 to 30 carbon atoms, or a substituent represented by general formula (II) below, wherein the methylene moiety of the alkyl group may be substituted with —O— or —CO—.

[Formula 3]

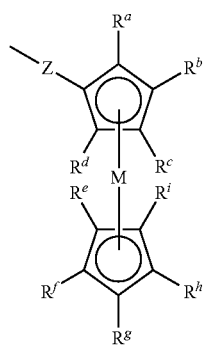

(II)

wherein $R^a$, $R^b$, $R^c$, $R^d$, $R^e$, $R^f$, $R^g$, $R^h$, and $R^i$ each represent a hydrogen atom, a hydroxyl group, or an alkyl group having 1 to 4 carbon atoms, wherein the alkylene moiety of which may be substituted with —O— or —CO—; Z represents a direct bond or a substituted or unsubstituted alkylene group having 1 to 8 carbon atoms, wherein the methylene moiety of which may be substituted with —O—, —S—, —CO—, —COO—, —OCO—, —SO$_2$—, —NH—, —CONH—, —NHCO—, —N=CH—, or —CH=CH—; and M represents a metal atom.

[Formula 4]

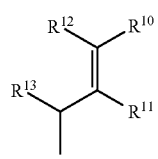

(III)

wherein $R^{10}$, $R^{11}$, $R^{12}$, and $R^{13}$ each represent a hydrogen atom, a halogen atom, a substituted or unsubstituted alkyl group having 1 to 4 carbon atoms, or a substituted or unsubstituted alkoxy group having 1 to 4 carbon atoms; and $R^{10}$ and $R^{11}$ may be connected to each other to form a carbocyclic or heterocyclic ring having 3 to 12 carbon atoms.

In general formula (I), the linking group as represented by Q, the polymethine chain of which may contain a ring structure is preferably exemplified by groups represented by structural formulae (1) through (10):

[Formula 5]

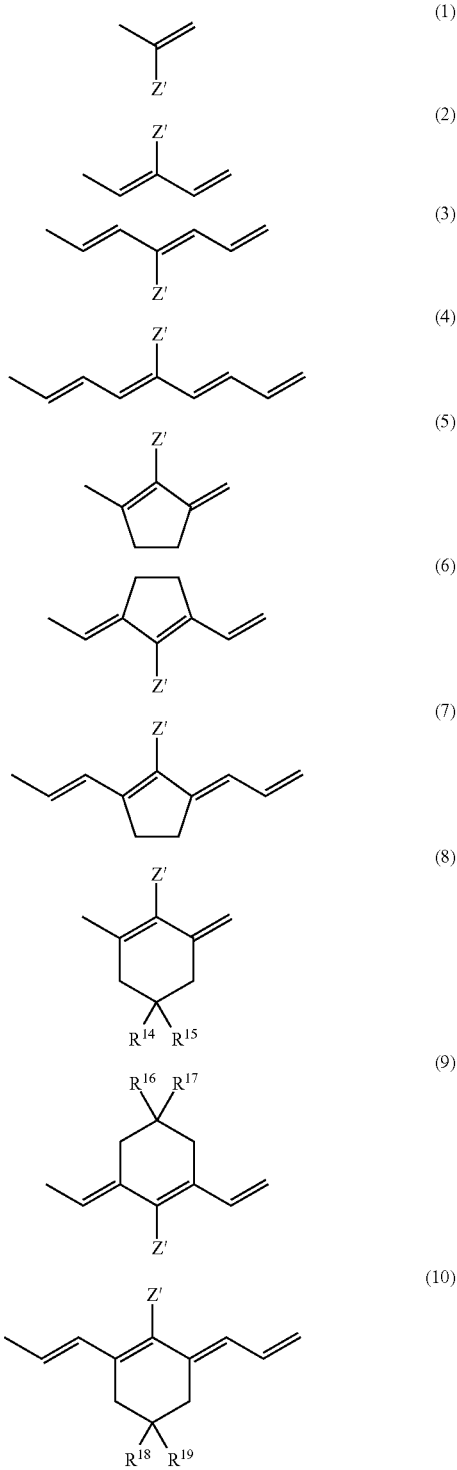

wherein $R^{14}$, $R^{15}$, $R^{16}$, $R^{17}$, $R^{18}$, and $R^{19}$ each represent a hydrogen atom, a hydroxyl group, a halogen atom, a cyano group, an aryl group having 6 to 30 carbon atoms, a diphenylamino group, an alkyl group having 1 to 8 carbon atoms, or an alkoxy group having 1 to 8 carbon atoms; and Z' represents a hydrogen atom, a hydroxyl group, a halogen atom, a cyano group, a diphenylamino group, an aryl group having 6 to 30 carbon atoms, an aralkyl group having 7 to 30 carbon atoms, or an alkyl group having 1 to 8 carbon atoms, wherein the alkyl group or the alkylene moiety of the aralkyl group may be substituted with an ether linkage or a thioether linkage.

In general formula (I), examples of the substituted or unsubstituted alkyl group with 1 to 8 carbon atoms as represented by $R^1$, $R^2$, $R^3$, $R^4$, $R^5$, $R^6$, $R^7$, $R^8$, $R^9$, $R^{20}$, $R^{21}$, $R^{22}$, $R^{23}$, $Y^a$, $Y^1$, $Y^2$, $Y^3$, and $Y^4$ include methyl, ethyl, propyl, isopropyl, butyl, s-butyl, t-butyl, isobutyl, amyl, isoamyl, t-amyl, hexyl, cyclohexyl, cyclohexylmethyl, cyclohexylethyl, heptyl, isoheptyl, t-heptyl, n-octyl, isooctyl, t-octyl, 2-ethylhexyl, trifluoromethyl, trichloromethyl, tribromomethyl, 1,2-dichloroethyl, and 3,3,3-trifluoropropyl. Examples of the substituted or unsubstituted alkoxy group with 1 to 8 carbon atoms as represented by $R^1$, $R^2$, $R^3$, $R^4$, $R^5$, $R^6$, $R^7$, $R^{20}$, $R^{21}$, $R^{22}$, $R^{23}$, $Y^a$, $Y^1$, $Y^2$, $Y^3$, and $Y^4$ include methoxy, ethoxy, isopropoxy, propoxy, butoxy, pentyloxy, isopentyloxy, hexyloxy, heptyloxy, octyloxy, 2-ethylhexyloxy, trifluoromethoxy, trichloromethoxy, and tribromomethoxy. Examples of the substituted or unsubstituted aryl group with 6 to 30 carbon atoms as represented by $R^1$, $R^2$, $R^3$, $R^4$, $R^5$, $R^6$, $R^7$, $R^8$, $R^9$, $R^{20}$, $R^{21}$, $R^{22}$, $R^{23}$, $Y^a$, $Y^1$, $Y^2$, $Y^3$, and $Y^4$ in general formula (I) include phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-t-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-t-butylphenyl, 2,5-di-t-butylphenyl, 2,6-di-t-butylphenyl, 2,4-di-t-pentylphenyl, 2,5-di-t-amylphenyl, 2,5-di-t-octylphenyl, 2,4-dicumylphenyl, cyclohexylphenyl, biphenyl, and 2,4,5-trimethylphenyl. Examples of the substituted or unsubstituted aralkyl group with 7 to 30 carbon atoms as represented by $R^1$, $R^2$, $R^3$, $R^4$, $R^5$, $R^6$, $R^7$, $R^8$, $R^9$, $R^{20}$, $R^{21}$, $R^{22}$, $R^{23}$, $Y^a$, $Y^1$, $Y^2$, $Y^3$, and $Y^4$ include benzyl, phenethyl, 2-phenylpropan-2-yl, and diphenylmethyl, triphenylmethyl, styryl, cinnamyl. Examples of the halogen atom as represented by $R^1$, $R^2$, $R^3$, $R^4$, $R^5$, $R^6$, $R^7$, $R^{20}$, $R^{21}$, $R^{22}$, and $R^{23}$ include a fluorine atom, a chlorine atom, a bromine atom, and an iodine atom. Examples of the carbocyclic or heterocyclic ring having 3 to 12 carbon atoms as formed by the connection of $R^1$ and $R^2$, $R^4$ and $R^5$, $R^6$ and $R^7$, $R^{20}$ and $R^{21}$, $R^{21}$ and $R^{22}$, or $R^{22}$ and $R^{23}$ include aromatic rings, such as benzene, naphthalene, chlorobenzene, bromobenzene, methylbenzene, ethylbenzene, methoxybenzene, and ethoxybenzene; heterocyclic rings, such as furan, benzofuran, pyrrole, thiophene, pyridine, quinoline, and thiazole; and aliphatic rings, such as cyclopropane, cyclobutane, cyclopentane, cyclohexane, cycloheptane, and cyclooctane. The methylene moiety of the alkyl group in $Y^a$, $Y^1$, $Y^2$, $Y^3$, and $Y^4$ may be substituted with —O— or —CO—.

In general formula (II), examples of the alkyl group having 1 to 4 carbon atoms as represented by $R^a$, $R^b$, $R^c$, $R^d$, $R^e$, $R^f$, $R^g$, $R^h$, or $R^i$ include methyl, ethyl, propyl, isopropyl, butyl, s-butyl, t-butyl, and isobutyl. Examples of the alkyl group with its methylene moiety substituted with —O— include methoxy, ethoxy, propoxy, isopropoxy, methoxymethyl, ethoxymethyl, and 2-methoxyethyl. Examples of the alkyl group a methylene moiety of which is substituted with —CO— include acetyl, 1-carbonylethyl, acetylmethyl, 1-carbonylpropyl, 2-oxobutyl, 2-acetylethyl, and 1-carbonylisopropyl. Examples of the substituted or unsubstituted alkylene group having 1 to 8 carbon atoms as represented by Z include methylene, ethylene, propylene, trimethylene, tetramethylene, 1,3-butanediyl, 2-methyl-1,3-propanediyl, 2-methyl-1,3-butanediyl, 2-methyl-1,4-butanediyl, pentamethylene, 1,4-pentanediyl, 2,4-pentanediyl, 2-methyl-1,4-pentanediyl, hexamethylene, heptamethylene, octamethylene, ethane-1,1-diyl, and propane-2,2-diyl. Examples of the alkylene group whose methylene moiety is substituted with —O—, —S—, —CO—, —COO—, —OCO—, —SO$_2$—, —NH—, —CONH—, —NHCO—, —N=CH—, or —CH=CH— include methyleneoxy, ethyleneoxy, oxymethylene, thiomethylene, carbonylmethylene, carbonyloxymethylene, methylenecarbonyloxy, sulfonylmethylene, aminomethylene, acetylamino, ethylenecarboxyamide, ethaneimidoyl, ethenylene, and propenylene. Examples of the metal atom as represented by M include Fe, Co, Ni, Ti, Cu, Zn, Zr, Cr, Mo, Os, Mn, Ru, Sn, Pd, Rh, Pt, and Ir.

In general formula (III), examples of the halogen atom, the substituted or unsubstituted alkyl group with 1 to 4 carbon atoms, and the substituted or unsubstituted alkoxy group with 1 to 4 carbon atoms as represented by $R^{10}$, $R^{11}$, $R^{12}$, or $R^{13}$ and the carbocyclic or heterocyclic ring with 3 to 12 carbon atoms as formed by the linkage of $R^{10}$ and $R^{11}$ are the same as those recited with respect to the corresponding groups in general formula (I).

Of the cations of the cyanine compounds represented by general formula (I), those of compounds represented by general formula (V) below are preferred for use in an optical filter; for they are produced at lower cost and provide a clay mineral complex having higher resistance to light, heat, and moist heat.

[Formula 6]

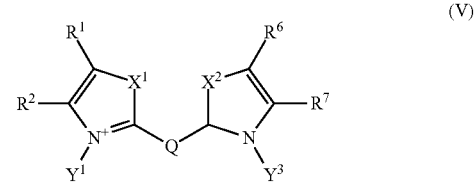

wherein $R^1$, $R^2$, $R^6$, $R^7$, $X^1$, $X^2$, $Y^1$, $Y^3$, and Q are as defined for general formula (I).

Of the cations of the cyanine compounds represented by general formula (V), still preferred for use in an optical filter are those of compounds represented by general formula (IV) below because they provide a clay mineral complex with higher resistance to heat and moist heat particularly when used in the pressure-sensitive adhesive layer of the optical filter.

[Formula 7]

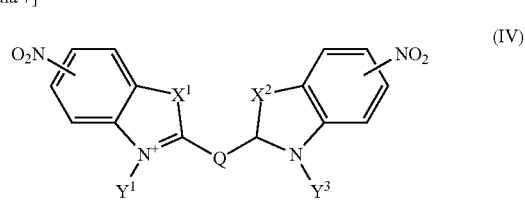

wherein Q, $Y^1$, $Y^3$, $X^1$, and $X^2$ are as defined for general formula (I).

The following compounds (compound Nos. 1 through 49) are specific examples of the cyanine compound of general formula (I) as a cation.
[Formula 8]
Compound No. 1
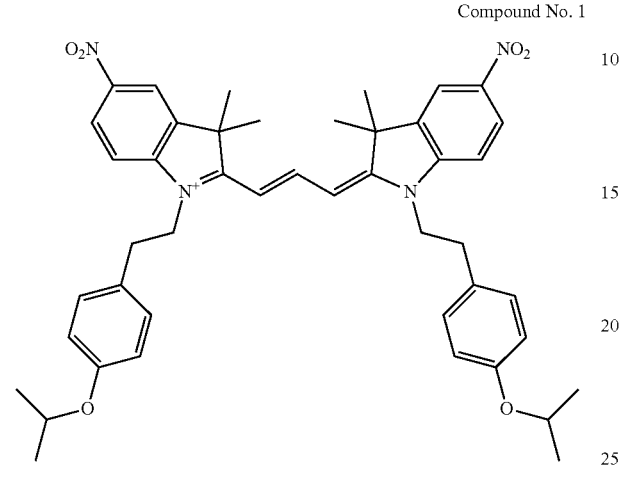
Compound No. 2
Compound No. 3
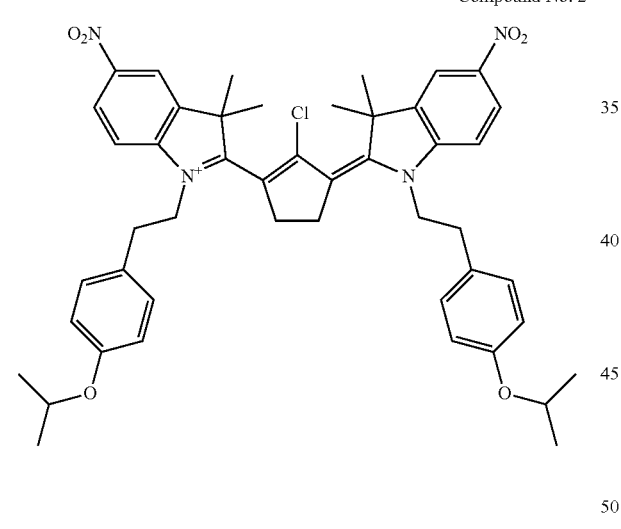
-continued
Compound No. 4
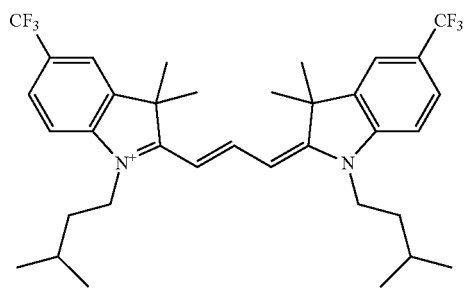
Compound No. 5
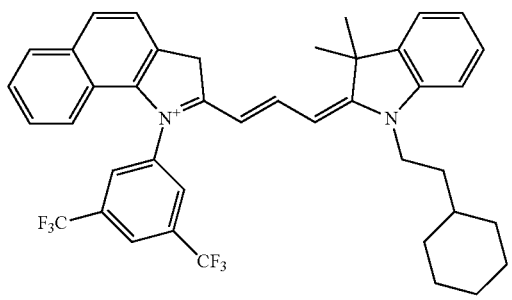
Compound No. 6
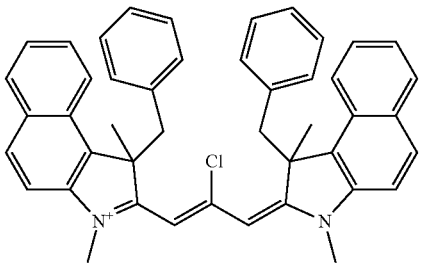
Compound No. 7
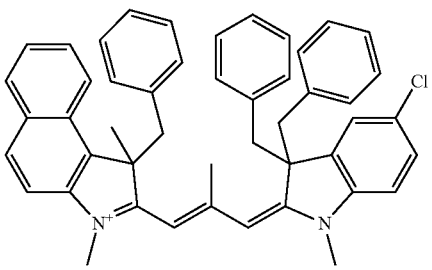
Compound No. 8
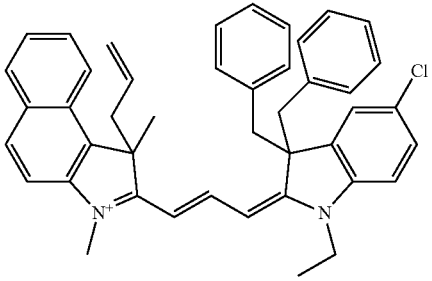
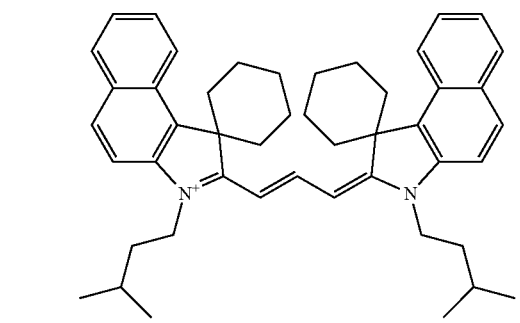

[Formula 9]
Compound No. 9
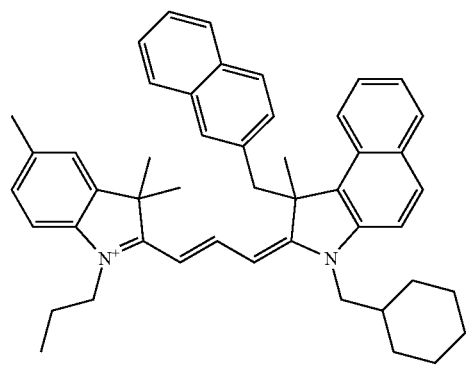
Compound No. 10
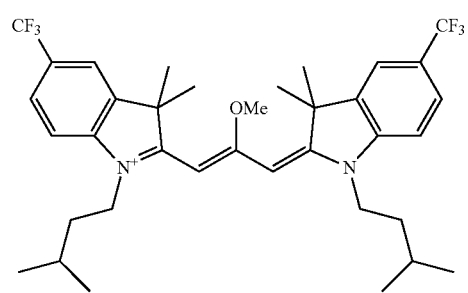
Compound No. 11
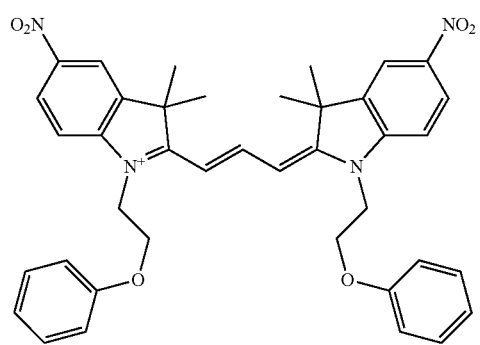
Compound No. 12
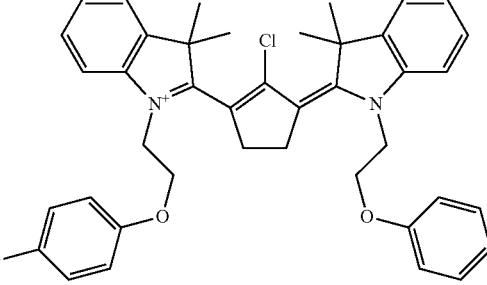
Compound No. 13
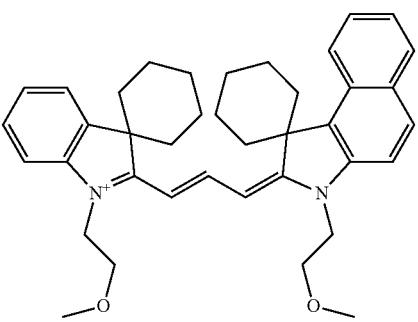
Compound No. 14
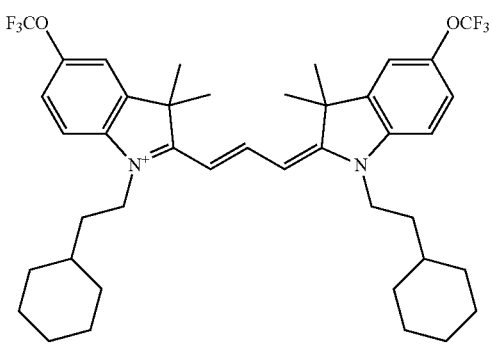
Compound No. 15
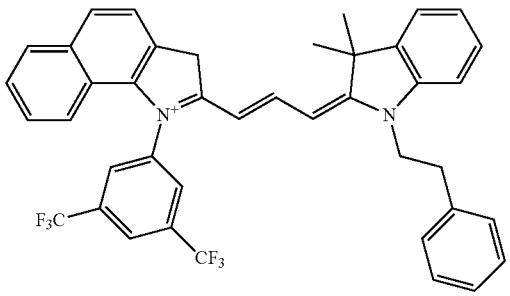
Compound No. 16
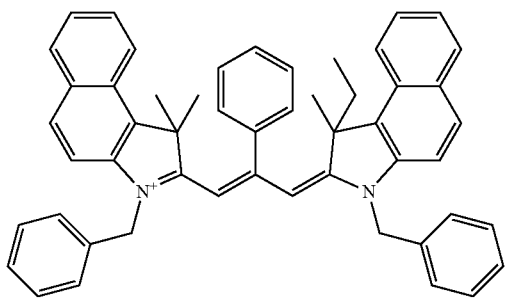
[Formula 10]
Compound No. 17
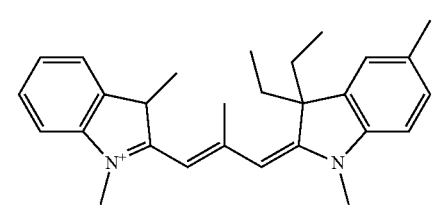

Compound No. 18
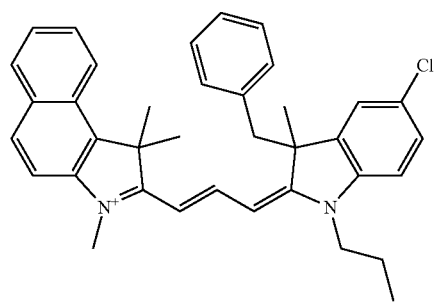
Compound No. 22
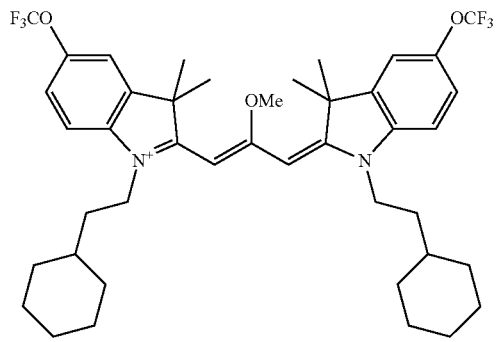
Compound No. 19
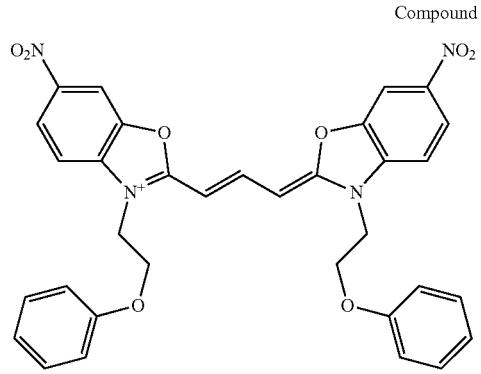
Compound No. 23
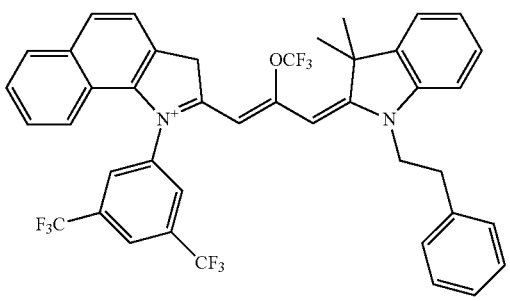
Compound No. 20
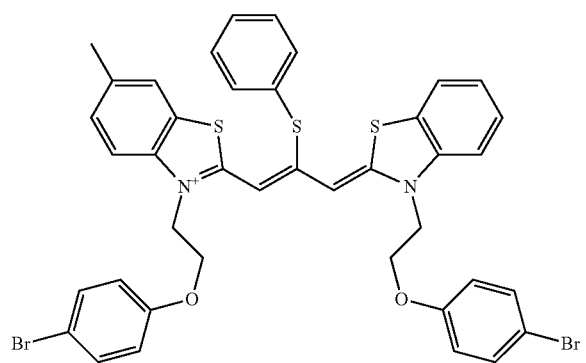
Compound No. 24
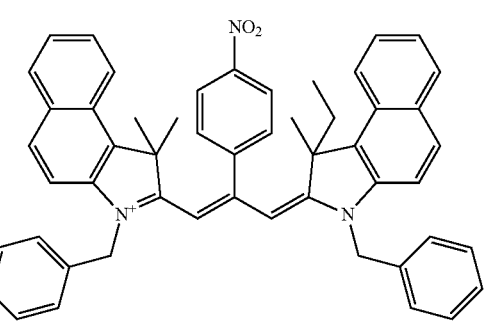
[Formula 11]
Compound No. 25
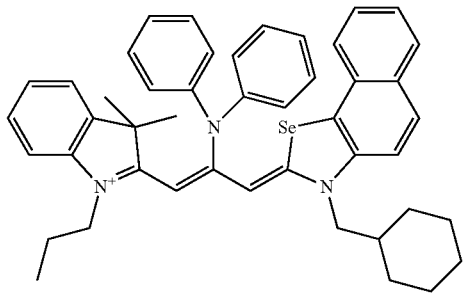
Compound No. 21
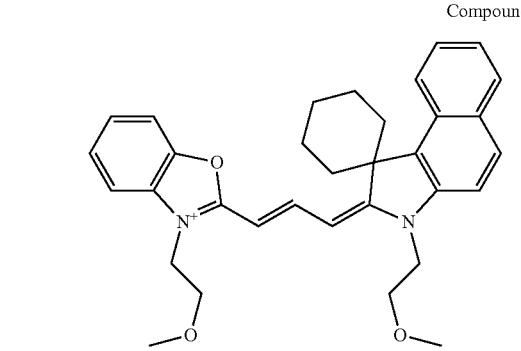
Compound No. 26
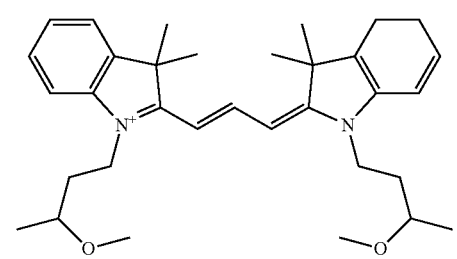

Compound No. 27
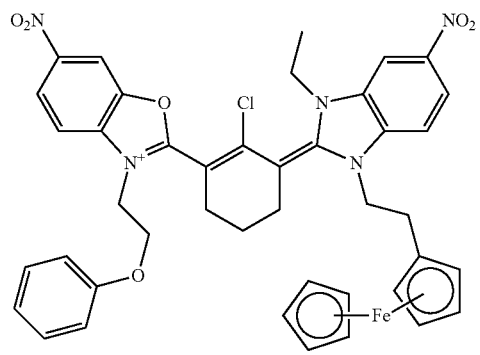
Compound No. 31
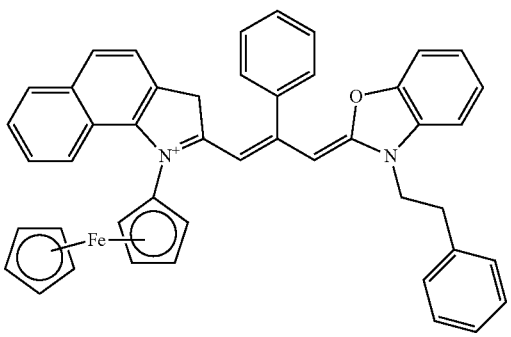
Compound No. 28
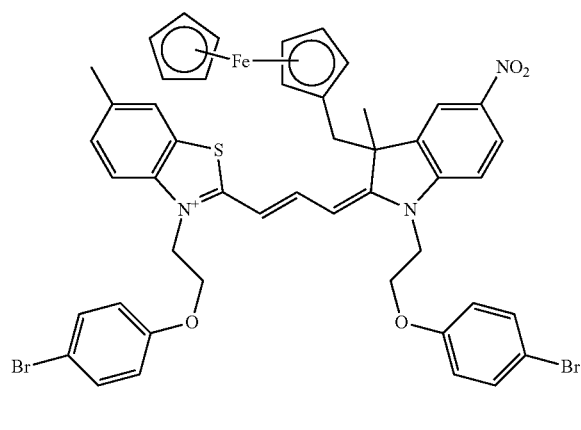
Compound No. 32
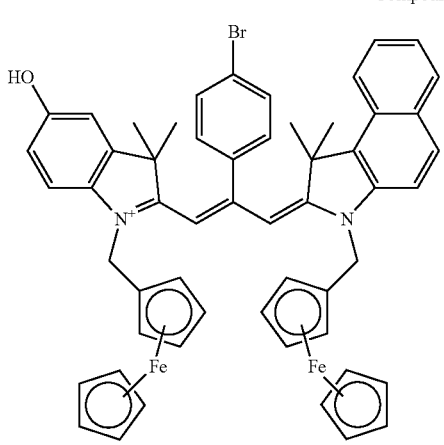
Compound No. 29
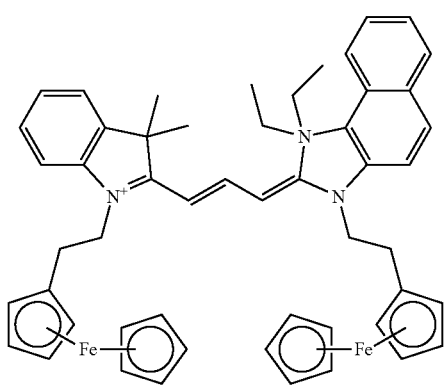
[Formula 12]
Compound No. 33
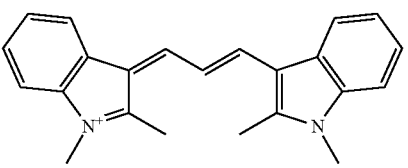
Compound No. 30
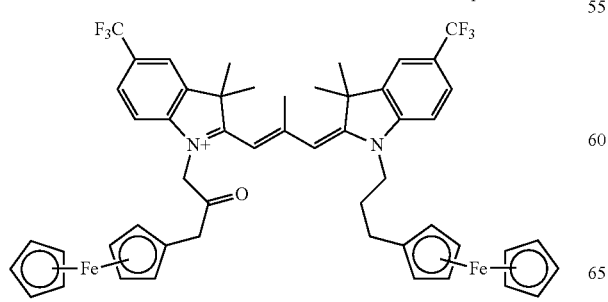
Compound No. 34
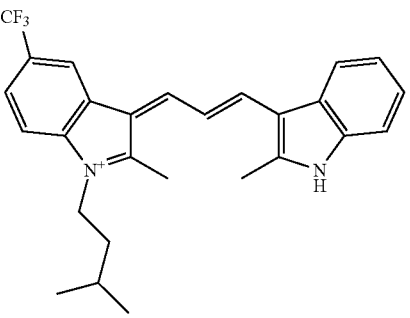

Compound No. 35
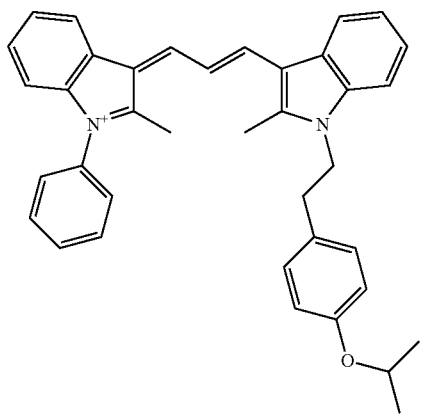
Compound No. 36
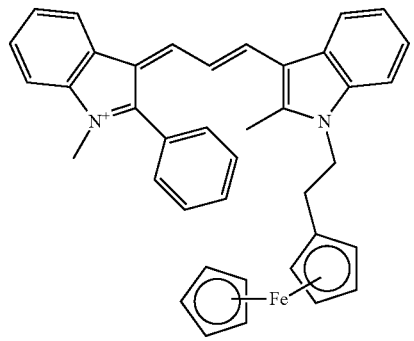
Compound No. 37
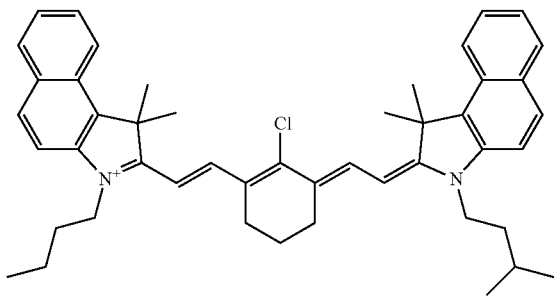
Compound No. 38
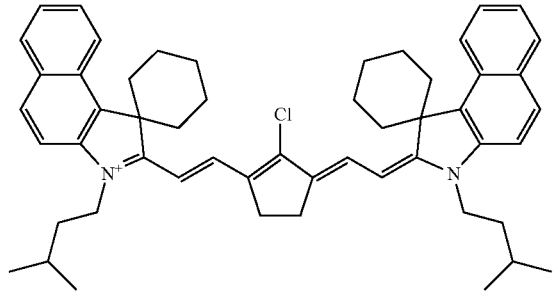
Compound No. 39
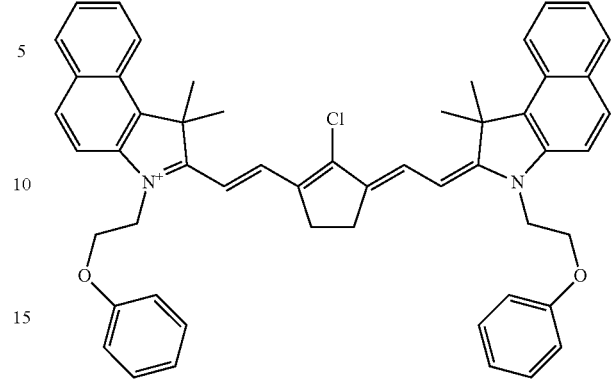
Compound No. 40
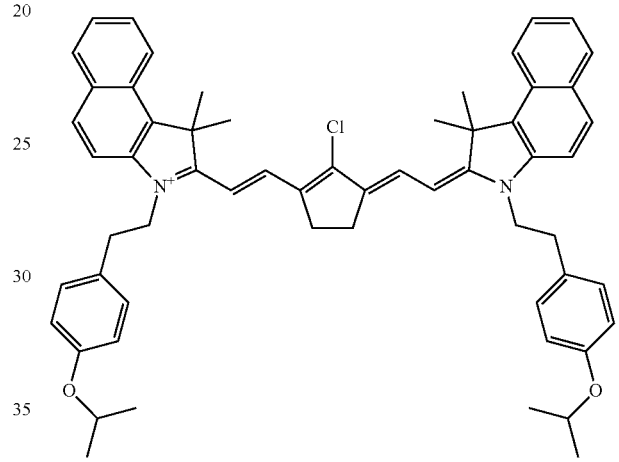
[Formula 13]
Compound No. 41
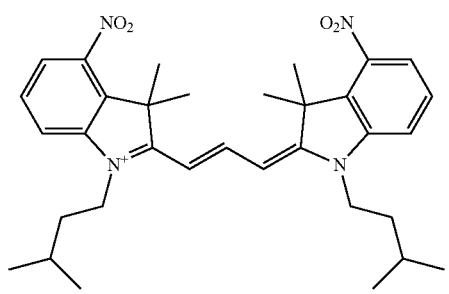
Compound No. 42
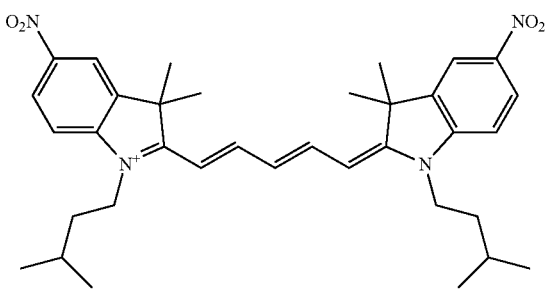

-continued

Compound No. 43
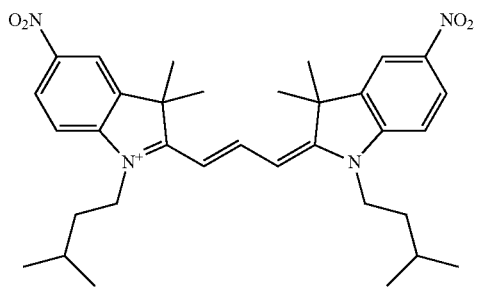

Compound No. 44
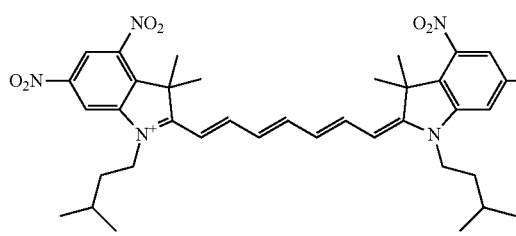

Compound No. 45
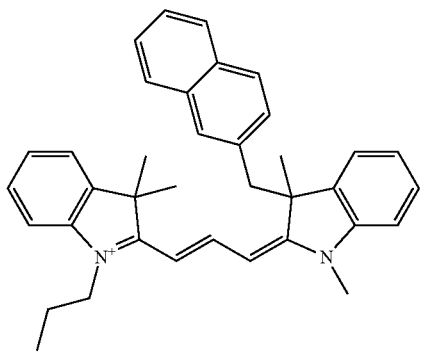

Compound No. 46
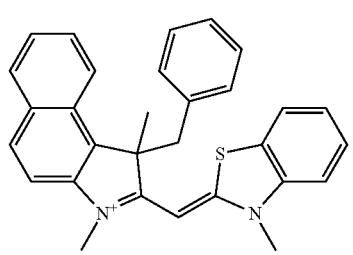

Compound No. 47
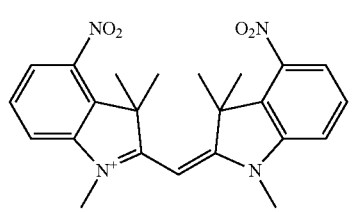

-continued

Compound No. 48
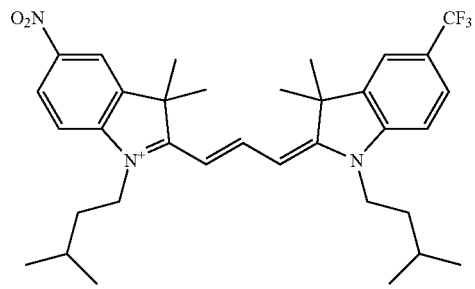

[Formula 14]

Compound No. 49
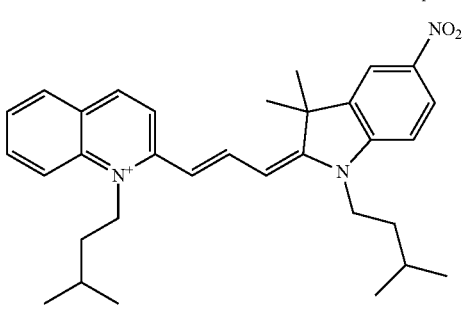

Examples of the diimmonium compound providing a cation include compounds represented by general formula (VI):

[Formula 15]

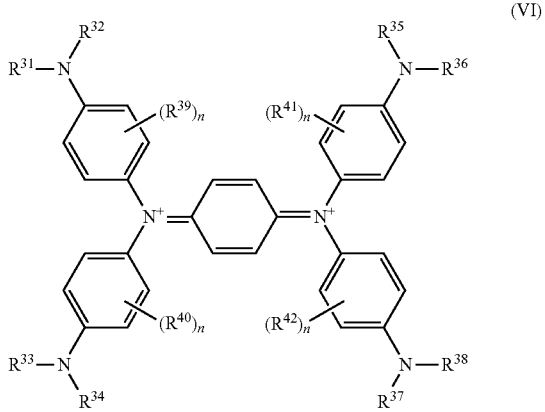

(VI)

wherein $R^{31}$, $R^{32}$, $R^{33}$, $R^{34}$, $R^{35}$, $R^{36}$, $R^{37}$, and $R^{38}$ each represent a hydrogen atom or a substituted or unsubstituted alkyl group having 1 to 8 carbon atoms; $R^{39}$, $R^{40}$, $R^{41}$, and $R^{42}$ each represent a hydrogen atom, a halogen atom, a substituted or unsubstituted alkyl group having 1 to 8 carbon atoms, or a substituted or unsubstituted amino group, wherein the methylene moiety of the alkyl group may be substituted with —O— or —CH=CH—; and n represents an integer of 1 to 4.

In general formula (VI), examples of the substituted or unsubstituted alkyl group having 1 to 8 carbon atoms as represented by $R^{31}$, $R^{32}$, $R^{33}$, $R^{34}$, $R^{35}$, $R^{36}$, $R^{37}$, $R^{38}$, $R^{39}$, $R^{40}$, $R^{41}$, and $R^{42}$ and examples of the halogen atom as represented by $R^{39}$, $R^{40}$, $R^{41}$, and $R^{42}$ are the same as those recited above, e.g., for $R^1$, $R^2$, $R^3$, $R^4$, $R^5$, $R^6$, and $R^7$ in general formula (I). Examples of the substituted or unsubstituted amino group as represented by $R^{39}$, $R^{40}$, $R^{41}$, and $R^{42}$ include amino, ethylamino, dimethylamino, diethylamine, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino, and phenylsulfonylamino.

The following compounds (compound Nos. 50 through 57) are specific examples of the diimmonium compounds represented by general formula (VI).

[Formula 16]

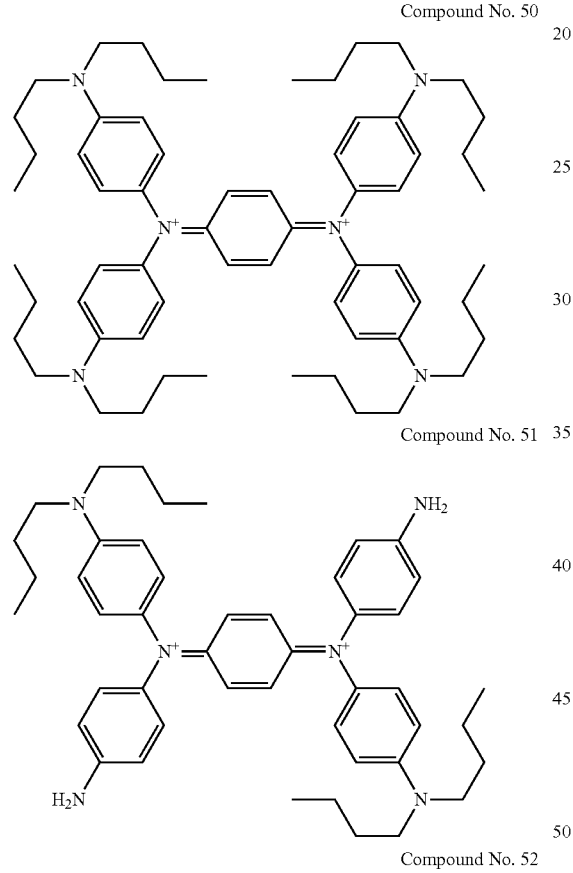

Compound No. 50

Compound No. 51

Compound No. 52

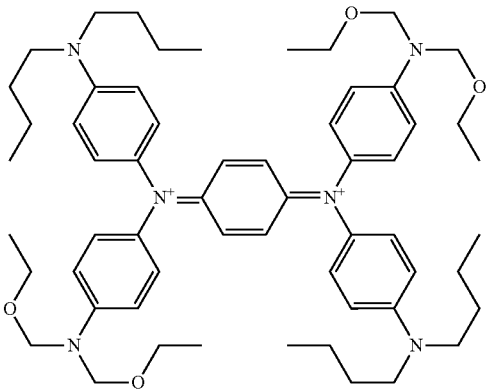

Compound No. 53

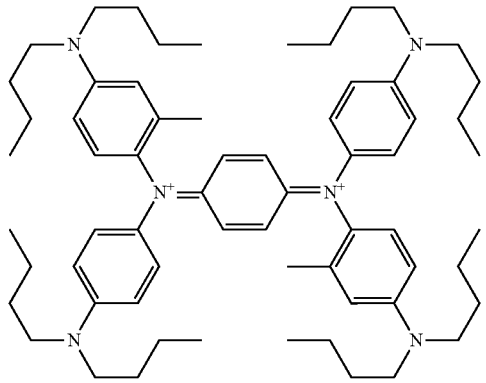

Compound No. 54

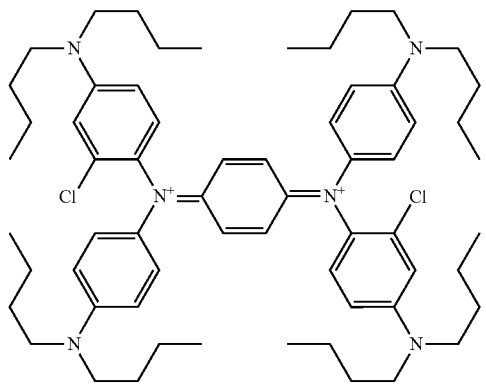

Compound No. 55

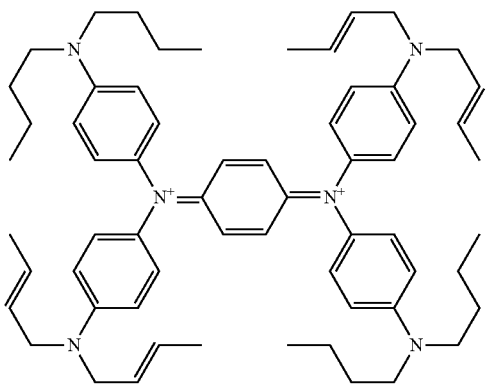

Compound No. 56

-continued

Compound No. 57

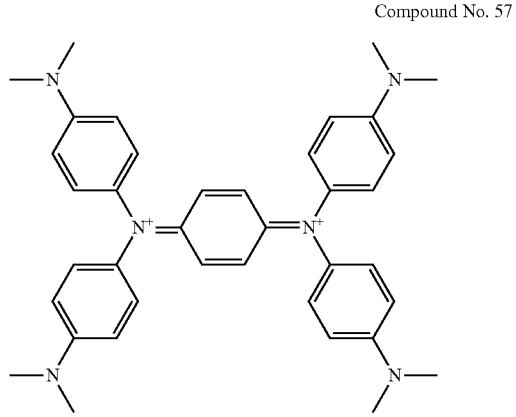

In the cases where a single species is used as the dye cation (C), it is preferred to use the compound represented by general formula (IV) (hereinafter "compound (IV)") or the compound represented by general formula (VI) (hereinafter "compound (VI)"). When two or more species of cations are used in combination, it is preferred, too, to use at least one of the compound (IV) and the compound (VI). When the compound (IV) and the compound (VI) are used in combination, the mass ratio of the compound (IV) to the compound (VI) is preferably 1:1 to 1:100, more preferably 1:5 to 1:50.

In the case where a compound (IV) and a compound (VI) are used in combination, the clay mineral complex of the invention may be prepared by intercalating both the compound (IV) and the compound (VI) into a layered clay mineral or mixing a clay mineral intercalated with the compound (IV) and a clay mineral intercalated with the compound (VI).

The organic cation (D) is exemplified by a quaternary ammonium ion and a phosphonium ion.

The quaternary ammonium ion preferably has an alkyl group, an aryl group, or an aralkyl group. Particularly preferred quaternary ammonium ions are those having an alkyl group with 1 to 20 carbon atoms, those having an aryl group with 6 to 30 carbon atoms, and those having an aralkyl group with 7 to 30 carbon atoms; for they have high affinity with an organic solvent when exchanged with the dye cation (C) and have a moderate viscosity when dispersed in an organic solvent. Examples of the quaternary ammonium ion include tetramethylammonium ion, tetraethylammonium ion, tetra-n-decylammonium ion, tetra-n-dodecylammonium ion, trioctylmethylammonium ion, trimethylstearylammonium ion, dimethyldistearylammonium ion, trilaurylmethylammonium ion, dimethyldioctadecylammonium ion, dimethyldidecylammonium ion, dimethylstearylbenzylammonium ion, and a cation of a compound represented by formula:

Examples of the phosphonium ion include an alkylphosphonium ion and an arylphosphonium ion.

[Formula 17]

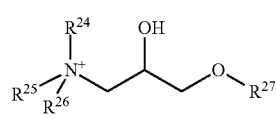

wherein $R^{24}$, $R^{25}$, $R^{26}$, and $R^{27}$ each represent an alkyl group having 1 to 20 carbon atoms.

The clay mineral complex (A) according to the invention is formed by intercalating the layered clay mineral (B) with the dye cation (C) and the organic cation (D). The ratio of the dye cation (C) and the organic cation (D) to one part of the layered clay mineral (B) is preferably 0.01 to 0.9 parts, more preferably 0.1 to 0.5 parts, of the dye cation (C) and 0.1 to 0.99 parts, more preferably 0.5 to 0.9 parts, of the organic cation (D). When the ratio of the organic cation (D) is less than 0.1 parts, the content of the dye cation (C) is small, which necessitates an increase in the amount of the clay mineral complex (A) to be used. When it is more than 0.9 parts, the clay mineral complex (A) has reduced dispersibility in an organic solvent, which can result in poor fabricability into an optical filter. When a mixture of two or more kinds of the dye cations is used as component (C), the above recited ranges of the ratios apply to the total amount of the dye cations (C).

The method of making the clay mineral complex (A) according to the invention is not particularly limited. For example, the clay mineral complex (A) is obtained as follows. In the case of starting with a lipophilic layered clay mineral (B) obtained by previously intercalating a layered clay mineral (B) with an organic cation (D) for lipophilization, a suspension of the lipophilic layered clay mineral (B) in an organic solvent and a solution of a salt between a dye cation (C) and an anion in an organic solvent are mixed to exchange part of the interlayer organic cations (D) in the lipophilic layered clay mineral (B) with the dye cation (C), and the resulting product is separated, purified, and dried to give a desired clay mineral complex (A).

In the case of starting with a hydrophilic layered clay mineral (B), the clay mineral complex (A) is obtained by (i) a method including dispersing the layered clay mineral (B) in water to prepare a suspension, exchanging the interlayer ion of the layered clay mineral with an organic cation (D), adding an acid until the dispersion is rendered weakly basic to acidic, and isolating and drying the resulting product or (ii) a method including dispersing the layered clay mineral in water, adding an acid until the dispersion is rendered weakly basic to acidic, dispersing the resulting layered clay mineral in water to prepare a suspension, exchanging the interlayer ion of the layered clay mineral with an organic cation (D), and separating and drying the resulting product. Both the methods (i) and (ii) further includes exchanging part of the interlayer organic cations (D) of the dried product with a dye cation (C) in the same manner as with the case of using the lipophilic layered clay mineral (B) to obtain a desired clay mineral complex (A) of the invention.

If the product as formed in the above described methods is used as a clay mineral complex without being separated and dried to prepare a coating composition for an optical filter, a component insoluble in an organic solvent, such as a quaternary ammonium salt, remains in the coating composition. As a result, the optical filter has reduced moist heat resistance, and ion exchange between the interlayer organic cations (D) and the dye cations (C) is hindered, raising the need to increase the amount of the layered clay mineral (B) to be used. This leads to thickening a coating composition, flocculation of the clay mineral complex (A), or increasing the cost.

Examples of the binder resin (E) that can be used in the invention include naturally occurring polymers, such as gelatin, casein, starch, cellulose derivatives, and alginic acid; synthetic polymers, such as polymethyl methacrylate, polyvinyl butyral, polyvinylpyrrolidone, polyvinyl alcohol, polyvinyl chloride, styrene-butadiene copolymers, polystyrene, polyester, polyether, polycarbonate, polyamide, polyimide, polyurethane, melamine resins, and cyclic olefin resins; and pressure-sensitive adhesives.

Transparent pressure-sensitive adhesives known for laminated glass can be used, including silicon-, urethane- or acrylic-based pressure sensitive adhesives, polyvinyl butyral pressure-sensitive adhesives, polyvinyl ether pressure sensitive adhesives, ethylene-vinyl acetate pressure sensitive adhesives, polyolefin pressure sensitive adhesives, SBR pressure sensitive adhesives, and rubber pressure sensitive adhesives. Preferred of them are acrylic pressure sensitive adhesives, particularly acidic acrylic pressure sensitive adhesives. The pressure sensitive adhesive may be used in combination with an organic solvent, a tackifier, a softener, a light resistance imparting agent, an ultraviolet absorber, an antioxidant, a plasticizer, a defoaming agent, a leveling agent, a dispersant, a curing agent, and so forth.

The acrylic pressure sensitive adhesives include, but are not limited to, a homopolymer, or a copolymer of two or more, of monomers having a reactive functional group (e.g., carboxyl, hydroxyl, amido, amino or epoxy) and an ethylenically unsaturated double bond and a copolymer of the above described monomer having a reactive functional group and an ethylenically unsaturated double bond and a monomer having an ethylenically unsaturated double bond (e.g., a (meth) acrylic monomer or a vinyl monomer). If necessary, a crosslinking agent, such as a metal chelate compound, an isocyanate compound, a melamine compound, an epoxy compound, an amine compound, an aziridine compound, or an oxazoline compound, may be incorporated into the acrylic pressure sensitive adhesive as a curing agent to improve cohesive force of the adhesive.

Commercially available acrylic pressure sensitive agents may be used, including DB Bond 5541 (from Daiabond Industry Co., Ltd.), SK Dyne AS-1925, KP-2230, and SK-1811L (from Soken Chemical & Engineering Co., Ltd.), DX2-PDP-19 (from Nippon Shokubai Co., Ltd.), AT-3001 (from Saiden Chemical Industry Co., Ltd.), Oribain BPS5896 (from Toyo Ink Mfg. Co., Ltd.), and CS-9611 (from Nitto Denko Corp.).

The amounts of the clay mineral complex (A) and the binder resin (E) in the optical filter of the invention are not particularly limited but are generally as follows. In making an optical filter having a pressure sensitive adhesive layer, for example, a pressure sensitive adhesive solution is prepared from 100 parts by mass of solid components in a pressure sensitive adhesive (as the binder resin (E)), 0.0001 to 50 parts, preferably 0.001 to 5.0 parts, by mass of the layered clay mineral complex (A), and 0.1 to 1000 parts, preferably 1.0 to 500 parts, by mass of a solvent (e.g., methyl ethyl ketone). The pressure sensitive adhesive solution is applied to a transparent substrate, such as a PET film having been subjected to an adhesion enhancing treatment, and dried to provide an optical filter with a pressure sensitive adhesive layer having a thickness of 2 to 400 μm, preferably 5 to 40 μm. In the case of making an optical filter containing the essential components (A) to (C) and optional components, the same ratios of the components as described above shall apply.

In the case where the clay mineral complex (A), the binder resin (E), and optional components, such as a light absorber and various stabilizers, are incorporated into a pressure sensitive adhesive layer between adjacent two members selected from the transparent substrate and any optional layers, the two members selected from the transparent substrate and the optional layers are bonded together using a pressure sensitive adhesive containing the clay mineral complex (A) and others. A known separator film, such as a polyethylene terephthalate film having been subjected to an adhesion enhancing treatment, may be provided on the surface of the pressure sensitive adhesive layer.

The optical filter of the invention is useful in applications to image displays, such as liquid crystal displays (LCDs), plasma display panels (PDPs), electroluminescence displays (ELDs), cathode ray tubes (CRTs), CCD image sensors, CMOS sensors, vacuum fluorescent displays, and field emission displays; analysis equipment, fabrication of semiconductor devices, astronomical observation, optical communications, spectacle lenses, windows, and so on.

When applied to an image display, the optical filter of the invention is usually disposed in front of a display device. The optical filter may be affixed directly to the front surface of a display device or to the front or the back side of a front plate or an electromagnetic shield if provided in front of a display device.

When applied to an image display, the optical filter of the invention may contain a light absorber that absorbs light of wavelengths except 480 to 500 nm to adjust the color tone or a light absorber that absorbs light of wavelengths of 480 to 500 nm other than the salt of the dye cation and an anion used in the invention in order to prevent reflection of ambient light or image light. When applied to a plasma display, the optical filter may contain a near infrared absorber that absorbs light of 750 to 1100 nm other than the salt of the dye cation and an anion of the invention.

The light absorber for color tone adjustment is exemplified by those used to remove orange light of 550 to 600 nm, which include trimethine cyanine derivatives, such as trimethine indolium compounds, trimethine benzoxazolium compounds, and trimethine benzothiazolium compounds; pentamethine cyanine derivatives, such as pentamethine oxazolium compounds and pentamethine thiazolium compounds; squarylium dye derivatives, azomethine dye derivatives, xanthene dye derivatives, azo dye derivatives, pyromethene derivatives, azo metal complex derivatives, rhodamine dye derivatives, phthalocyanine derivatives, porphyrin derivatives, and dipyromethene metal chelate compounds.

Examples of the light absorber that absorbs light of 480 to 500 nm for preventing reflection of ambient light include monomethine cyanine derivatives; trimethine cyanine derivatives, such as trimethine indolium compounds, trimethine oxazolium compounds, trimethine thiazolium compounds, and indolidene trimethine thiazonium compounds; merocyanine derivatives, phthalocyanine derivatives, naphthalocyanine derivatives, porphyrin derivatives, and dipyromethene metal chelate compounds.

Examples of the near infrared absorber that absorbs light of 750 to 1100 nm to prevent malfunction of an infrared remote controller include pentamethine cyanine derivatives, such as pentamethine benzoindolium compounds, pentamethine benzoxazolium compounds, and pentamethine benzothiazolium compounds; heptamethine cyanine derivatives, such as heptamethine indolium compounds, heptamethine benzoindolium compounds, heptamethine oxazolium compounds, heptamethine benzoxazolium compounds, heptamethine thiazolium compounds, and heptamethine benzothiazolium compounds; diimmonium compounds, aminium compounds, squarylium derivatives; nickel complexes, such as bis(stilbenedithiolato) compounds, bis(benzenedithiolato)nickel compounds, and bis(camphordithiolato)nickel compounds; azo dye derivatives, phthalocyanine derivatives, porphyrin derivatives, and dipyromethene metal chelate compounds.

The optical filter of the invention may contain the light absorber for color tone adjustment, the light absorber for absorbing light of 480 to 500 nm, and the infrared absorber in the same layer that contains the clay mineral complex (A) or any other layer. They are each used in an amount of 10 to 5000 parts by mass per 100 parts by mass of the clay mineral complex (A).

A typical structure of the optical filter of the present invention includes a transparent substrate, on which a primer layer, an antireflective layer, a hard coat layer, a lubricating layer, a pressure sensitive adhesive layer, or a like layer is disposed as needed. While the method of incorporating the clay mineral complex (A), the binder resin (E), and optional components, such as a light absorber and various stabilizers, into the optical filter is not particularly restricted, it is preferred that these components be incorporated in a pressure sensitive adhesive layer between any two adjacent members selected from the transparent substrate and the optional layers.

The transparent substrate can be of inorganic materials, such as glass, and polymeric materials. Examples of polymeric materials include cellulose esters, such as diacetyl cellulose, triacetyl cellulose (TAC), propionyl cellulose, butyryl cellulose, acetylpropionyl cellulose, and nitrocellulose; polyamides; polyimides; polyurethanes; epoxy resins; polycarbonates; polyesters, such as polyethylene terephthalate, polyethylene naphthalate, polybutylene terephthalate, poly(1,4-cyclohexane dimethylene terephthalate), poly(ethylene-1,2-diphenoxyethane-4,4'-dicarboxylate), and polystyrenes; polyolefins, such as polyethylene, polypropylene, and polymethylpentene; vinyl compounds, such as polyvinyl acetate, polyvinyl chloride, and polyvinyl fluoride; acrylic resins, such as polymethyl methacrylate and polyacrylic esters; polysulfones; polyether sulfones; polyether ketones; polyether imides; polyoxyethylenes; and norbornene resins. It is preferred for the transparent substrate to have a transmittance of at least 80%, still preferably 86% or higher; a haze of not more than 2%, still preferably 1% or less; and a refractive index of 1.45 to 1.70.

The transparent substrate may contain an infrared absorber, an ultraviolet absorber, an antioxidants (e.g., a phenolic or phosphorous-containing antioxidant), a flame retardant, a lubricant, an antistatic agent, inorganic fine particles, and the like. The transparent substrate may be subjected to various surface treatments.

Examples of the inorganic fine particles include silicon dioxide, titanium dioxide, barium sulfate, and calcium carbonate.

The surface treatments include chemical treatments, mechanical treatments, a corona discharge treatment, a flame treatment, a UV irradiation treatment, a radiofrequency treatment, a glow discharge treatment, an active plasma treatment, a laser treatment, a mixed acid treatment, and an ozone oxidation treatment.

The primer layer is a layer provided between the transparent substrate and a light absorbing layer containing a light absorber if provided. The primer layer is a layer containing a polymer having a glass transition temperature of $-60°$ to $60°$ C., a layer with a rough surface on the light absorbing layer side thereof, or a layer containing a polymer having affinity to the polymer of the light absorbing layer. Even where an independent light absorbing layer is not provided, a primer layer may be provided on the transparent substrate to improve the adhesion between the substrate and a layer provided thereon (e.g., an antireflective layer or a hard coat layer). A primer layer may also be provided in order to improve the affinity of the optical filter to an adhesive with which the optical filter is to be affixed to an image display device.

The thickness of the primer layer is suitably 2 nm to 20 μm, preferably 5 nm to 5 μm, more preferably 20 nm to 2 μm, even more preferably 50 nm to 1 μm, most preferably 80 nm to 300 nm. The primer layer containing a polymer whose glass transition temperature ranges from $-60°$ to $60°$ C. serves to bond the transparent substrate and a filter layer because of its tackiness. Examples of the polymer whose glass transition temperature is $-60°$ to $60°$ C. include homo- and copolymers of vinyl chloride, vinylidene chloride, vinyl acetate, butadiene, neoprene, styrene, chloroprene, acrylic esters, methacrylic esters, acrylonitrile or methyl vinyl ether. The glass transition temperature of the polymer is preferably $50°$ C. or lower, more preferably $40°$ C. or lower, even more preferably $30°$ C. or lower, still even more preferably $25°$ C. or lower, most preferably $20°$ C. or lower. It is preferred for the primer layer to have an elastic modulus of 1 to 1000 MPa, more preferably 5 to 800 MPa, even more preferably 10 to 500 MPa, at $25°$ C.

The primer layer with a rough surface serves for adhesion between the transparent substrate and a light absorbing layer provided on the rough surface side thereof. Such a primer layer can easily be formed by applying a polymer latex. The polymer latex preferably has an average particle size of 0.02 to 3 μm, more preferably 0.05 to 1 μm.

Examples of the polymer having affinity to the polymer (binder) of the light absorbing layer include acrylic resins, cellulose derivatives, gelatin, casein, starch, polyvinyl alcohol, soluble nylon, and polymer latices.

The optical filter may have two or more primer layers. The primer layer may contain a solvent for swelling a transparent substrate, a matting agent, a surfactant, an antistatic agent, a coating aid, a hardener, and so forth.

The antireflective layer essentially contains a low refractive sublayer having a lower refractive index than the transparent substrate. The refractive index of the low refractive sublayer is preferably 1.20 to 1.55, still preferably 1.30 to 1.50. The thickness of the low refractive sublayer is preferably 50 to 400 nm, still preferably 50 to 200 nm. The low refractive sublayer may be a layer of low-refractive, fluorine-containing polymer (see JP 57-34526A, JP 3-130103A, JP 6-115023A, JP 8-313702A, and JP 7-168004A), a layer formed by a sol-gel process (see JP 5-208811A, JP 6-299091A, and JP 7-168003A), or a layer containing fine particles (see JP 60-59250B, JP 5-13021A, JP 6-56478A, JP 7-92306A, and JP 9-288201A). The low refractive sublayer containing fine particles has microvoids formed between the fine particles or inside the fine particles. The low refractive sublayer containing fine particles preferably has a void of 3% to 50% by volume, still preferably 5% to 35% by volume.

In order to prevent reflection over a broad wavelength range, the antireflective layer preferably contains a medium and a high refractive sublayer in addition to the low refractive sublayer. The refractive index of a high refractive sublayer is preferably 1.65 to 2.40, still preferably 1.70 to 2.20. The refractive index of a medium refractive sublayer is set to be the intermediate between the refractive indices of the low and the high refractive sublayers and is preferably 1.50 to 1.90, still preferably 1.55 to 1.70. The thickness of the medium and the high refractive sublayers is preferably 5 nm to 100 μm, still preferably 10 nm to 10 μm, even still preferably 30 nm to 1 μm. The haze of the medium and the high refractive sublayers is preferably 5% or less, still preferably 3% or less, even still preferably 1% or less. The medium and the high refractive sublayers are formed by using polymer binders having relatively high refractive indices, such as polystyrene, styrene copolymers, polycarbonates, melamine resins, acrylic resins, phenol resins, epoxy resins, and polyurethanes obtained by the reaction between a cyclic (alicyclic or aromatic) isocyanate and a polyol. Polymers having a cyclic (aromatic, heterocyclic or alicyclic) group and polymers having a halogen atom except fluorine as a substituent also have high refractive indices. Polymers prepared from monomers having a double bond introduced therein and thereby capable of radical polymerization are also useful.

Fine inorganic particles may be dispersed in the above recited polymer binders to increase the refractive index. Fine inorganic particles having a refractive index of 1.80 to 2.80 are used preferably. Such fine inorganic particles are preferably prepared from metal oxides or sulfides, such as titanium oxide (including rutile, rutile/anatase mixed crystals, anatase, and amorphous oxide), tin oxide, indium oxide, zinc oxide, zirconium oxide, and zinc sulfide. Preferred of them are titanium oxide, tin oxide, and indium oxide. The fine inorganic particles may contain the metal oxide or sulfide as a major component and other elements as a minor component. The term "major component" means a component present in the particles in the highest weight proportion. Other elements that may be present include Ti, Zr, Sn, Sb, Cu, Fe, Mn, Pb, Cd, As, Cr, Hg, Zn, Al, Mg, Si, P, and S. The medium or high refractive sublayer can also be formed by using inorganic materials that are liquid per se or dispersible in a solvent and are capable of forming a film, such as alkoxides of various elements, salts of organic acids, coordination compounds having a coordinating compound bonded (e.g., chelate compounds), and inorganic active polymers.

The surface of the antireflective layer may be endowed with an antiglare function for scattering incident light thereby preventing the surrounding environment from reflecting on the antireflective layer. For example, fine roughness is formed on a transparent film, and an antireflective layer is formed on the roughened surface, or the surface of an antireflective layer is embossed with an embossing roll to have fine surface roughness. An antireflective layer with an antiglare function usually has a haze of 3% to 30%.

The hard coat layer has higher hardness than the transparent substrate. The hard coat layer preferably contains a crosslinked polymer. The hard coat layer can be formed by using acrylic, urethane or epoxy polymers, oligomers or monomers, such as UV curing resins. The hard coat layer can also be made of a silica-based material.

A lubricating layer may be provided on the antireflective layer (low refractive sublayer). A lubricating layer imparts slip properties to the surface of the low refractive sublayer thereby improving scratch resistance. The lubricating layer can be formed using organopolysiloxanes (e.g., silicone oil), natural waxes, petroleum waxes, higher fatty acid metal salts, or fluorine-containing lubricants or derivatives thereof. The lubricating layer preferably has a thickness of 2 to 20 nm.

Examples of the organic solvents include alcohols, such as isopropyl alcohol; ether alcohols, such as methyl cellosolve, ethyl cellosolve, butyl cellosolve, and butyl diglycol; ketones, such as acetone, methyl ethyl ketone, methyl isobutyl ketone, cyclohexanone, and diacetone alcohol; esters, such as ethyl acetate, butyl acetate, and methoxyethyl acetate; acrylic esters, such as ethyl acrylate and butyl acrylate; fluoroalcohols, such as 2,2,3,3-tetrafluoropropanol; hydrocarbons, such as hexane, benzene, toluene, and xylene; and chlorinated hydrocarbons, such as methylene dichloride, dichloroethane, and chloroform. These organic solvents may be used either individually or as a mixture thereof.

The primer layer, antireflective layer, hard coat layer, lubricating layer, light absorbing layer, pressure sensitive adhesive layer, and the like can be formed by commonly employed coating methods including dip coating, air knife coating, curtain coating, roller coating, wire bar coating, gravure coating, and extrusion coating using a hopper (see U.S. Pat. No. 2,681,294). Two or more layers can be formed by simultaneous coating. For the details of simultaneous coating techniques, reference can be made in U.S. Pat. Nos. 2,761,791, 2,941,898, 3,508,947, and 3,526,528, and Harasaki Yuji, *Coating Kogaku*, Asakura Shoten, 1973, 253.

EXAMPLES

The present invention will now be illustrated in greater detail with reference to Evaluation Examples, Comparative Evaluation Examples, and Examples, but it should be understood that the invention is not construed as being limited thereto. Preparation Examples 1 to 4 show examples of synthesis of the clay mineral complexes according to the invention. Evaluation Examples 1 to 4 show evaluation of durability of the clay mineral complex according to the invention. Examples 1 to 3 demonstrate fabrication of the optical filter containing the clay mineral complex of the invention.

Preparation Example 1

Synthesis of Clay Mineral Complex 1

A dispersion (20 g) of 1.0 g of Lucentite SAN210-A (lipophilic smectite, from CO-OP Chemical Co., Ltd.) as a layered clay mineral (B) in 19 g of methyl ethyl ketone and a solution (6 g) of 0.3 g of a bistrifluoromethylsulfonylimide salt of compound No. 1 as a dye cation (C) in 5.7 g of methyl ethyl ketone were mixed and stirred for 1 hour to exchange part of the interlayer organic cation (D) of Lucentite SAN210-A with compound No. 1 (dye cation (C)). To the reaction system was added 150 ml of methanol. The solid thus precipitated was collected by filtration and washed successively with water and methanol to give 0.75 g of clay mineral complex 1.

Preparation Example 2

Synthesis of Clay Mineral Complex 2

Clay mineral complex 2 weighing 0.64 g was obtained in the same manner as in Preparation Example 1, except for using a solution (6 g) having 0.5 g of compound No. 1 bistrifluoromethylsulfonylimide salt dissolved in 5.5 g of methyl ethyl ketone.

Preparation Example 3

Synthesis of Clay Mineral Complex 3

A dispersion (20 g) of 1.0 g of Lucentite SAN210-A (lipophilic smectite, from CO-OP Chemical Co., Ltd.) as a layered clay mineral (B) in 19 g of methyl ethyl ketone and a solution (6 g) of 0.3 g of a bistrifluoromethylsulfonylimide salt of compound No. 50 (dye cation (C)) in 5.7 g of methyl ethyl ketone were mixed and stirred for 1 hour. To the reaction system was added 150 ml of methanol. The solid thus precipitated was collected by filtration and washed successively with water and methanol to give 0.77 g of clay mineral complex 3.

Preparation Example 4

Synthesis of Clay Mineral Complex 4

Clay mineral complex 4 weighing 0.58 g was obtained in the same manner as in Preparation Example 1, except for using 6 g of a solution having 0.5 g of compound No. 50 bistrifluoromethylsulfonylimide salt dissolved in 5.5 g of methyl ethyl ketone.

Confirmation of Intercalation

In order to confirm the presence of the dye cation intercalated in the clay mineral complexes obtained in Preparation Examples 1 to 4, the basal spacing of the clay mineral complex was calculated from the X-ray diffraction pattern measured with RINT2000-ULTIMA+ (from Rigaku Corp.). The results obtained are shown in Table 1. The results show an increase of basal spacing over SAN210-A, indicating intercalation of the dye cation into the layered clay mineral.

TABLE 1

| Sample | Basal Spacing (A) |
|---|---|
| SAN210-A | 17.0 |
| Clay mineral complex 1 | 19.5 |
| Clay mineral complex 2 | 22.0 |
| Clay mineral complex 3 | 19.2 |
| Clay mineral complex 4 | 19.2 |

Evaluation Examples 1 to 4 and Comparative Evaluation Examples 1 to 4

Evaluation of Durability

A pressure sensitive adhesive solution prepared in accordance with the formulation below was applied to a 188 μm thick polyethylene terephthalate (PET) film having been subjected to an adhesion enhancing treatment by means of a bar coater #90 and dried at 100° C. for 5 minutes. A 0.9 mm thick glass sheet was stuck to the PET film via the adhesive layer to make specimens. The following tests for evaluating durability were carried out using the specimens.

Light Resistance

The transmittance of the specimen was measured at the $\lambda_{max}$ in the UV absorption spectrum. The specimen was then irradiated with 55000 lux light for 300 hours and 500 hours. The transmittance at the $\lambda_{max}$ in the UV absorption spectrum was again measured. The percentage of the transmittance after the irradiation to the transmittance before the irradiation was calculated as a measure of light resistance. The results obtained are shown in Tables 2 and 3.

Heat Resistance

The transmittance of the specimen was measured at $\lambda_{max}$ in the UV absorption spectrum was measured. The transmittance at $\lambda_{max}$ was again measured after the specimen was left to stand in a constant-temperature chamber set at 80° C. for 300 hours and 500 hours. The percentage of the transmittance after the heating to the transmittance before the heating was calculated as a measure of heat resistance. The results are shown in Tables 2 and 3.

Moist Heat Resistance

The transmittance of the specimen was measured at $\lambda_{max}$ in the UV absorption spectrum before and after the specimen was left to stand in a constant-temperature, constant-humidity chamber set at 60° C./90% RH for 300 hours and 500 hours. The percentage of the transmittance after the moist heating to the transmittance before the moist heating was calculated as a measure of moist heat resistance. The results are shown in Tables 2 and 3.

Formulation of Evaluation Example 1

| | |
|---|---|
| Clay mineral complex 1 | 8.00 mg |
| Acrylic pressure sensitive adhesive | 4.68 g |
| (DB Bond 5541, from Diabond Industry Co., Ltd.) | |
| Methyl ethyl ketone | 1.99 g |

Formulation of Evaluation Example 2

| | |
|---|---|
| Clay mineral complex 2 | 6.00 mg |
| Acrylic pressure sensitive adhesive | 4.68 g |
| (DB Bond 5541, from Diabond) | |
| Methyl ethyl ketone | 1.99 g |

Formulation of Comparative Evaluation Example 1

| | |
|---|---|
| Compound No. 1 bistrifluoromethylsulfonylimide salt | 2.00 mg |
| Acrylic pressure sensitive adhesive | 4.68 g |
| (DB Bond 5541, from Diabond) | |
| Methyl ethyl ketone | 1.99 g |

Formulation of Comparative Evaluation Example 2

| | |
|---|---|
| Lucentite SAN210-A | 4.00 mg |
| Compound No. 1 perchlorate salt | 2.00 mg |
| Acrylic pressure sensitive adhesive | 4.68 g |
| (DB Bond 5541, from Diabond) | |
| Methyl ethyl ketone | 1.99 g |

TABLE 2

| | Light Resistance (%) | | Heat Resistance (%) | | Moist Heat Resistance (%) | |
|---|---|---|---|---|---|---|
| | 300 hrs | 500 hrs | 300 hrs | 500 hrs | 300 hrs | 500 hrs |
| Evaluation Example 1 | 82.6 | 75.2 | 92.0 | 89.0 | 98.0 | 97.8 |
| Evaluation Example 2 | 78.8 | 71.8 | 85.6 | 82.3 | 96.4 | 94.3 |
| Compara. Evaluation Example 1 | 47.4 | 39.6 | 27.8 | 25.2 | 52.4 | 34.1 |
| Compara. Evaluation Example 2 | 68.7 | 51.1 | 82.8 | 73.3 | 90.0 | 81.1 |

Formulation of Evaluation Example 3

| | |
|---|---|
| Clay mineral complex 3 | 120.00 mg |
| Acrylic pressure sensitive adhesive | 4.68 g |
| (DB Bond 5541, from Diabond) | |
| Methyl ethyl ketone | 1.99 g |

Formulation of Evaluation Example 4

| | |
|---|---|
| Clay mineral complex 4 | 90.00 mg |
| Acrylic pressure sensitive adhesive | 4.68 g |
| (DB Bond 5541, from Diabond) | |
| Methyl ethyl ketone | 1.99 g |

Formulation of Comparative Evaluation Example 3

| | |
|---|---|
| Compound No. 50 bistrifluoromethylsulfonylimide salt | 30.00 mg |
| Acrylic pressure sensitive adhesive (DB Bond 5541, from Diabond) | 4.68 g |
| Methyl ethyl ketone | 1.99 g |

Formulation of Comparative Evaluation Example 4

| | |
|---|---|
| Lucentite SAN210-A | 90.00 mg |
| Compound No. 50 bistrifluoromethylsulfonylimide salt | 30.00 mg |
| Acrylic pressure sensitive adhesive (DB Bond 5541, from Diabond) | 4.68 g |
| Methyl ethyl ketone | 1.99 g |

TABLE 3

| | Light Resistance (%) | | Heat Resistance (%) | | Moist Heat Resistance (%) | |
|---|---|---|---|---|---|---|
| | 300 hrs | 500 hrs | 300 hrs | 500 hrs | 300 hrs | 500 hrs |
| Evaluation Example 3 | 99.9 | 99.9 | 99.8 | 99.8 | 99.9 | 99.8 |
| Evaluation Example 4 | 99.7 | 99.0 | 97.1 | 96.1 | 99.5 | 99.2 |
| Compara. Evaluation Example 3 | 96.9 | 91.6 | 36.6 | 24.0 | 39.2 | 28.5 |
| Compara. Evaluation Example 4 | 99.7 | 99.6 | 96.6 | 94.2 | 98.1 | 97.1 |

Example 1

Fabrication of Optical Filter 1

A pressure sensitive adhesive solution prepared according to the following formulation was applied to a 188 μm thick PET film having been subjected to an adhesion enhancing treatment using a bar coater #90 and dried at 100° C. for 10 minutes to make an optical filter having a pressure sensitive adhesive layer with a thickness of about 10 μm on the PET film. The optical filter had a $\lambda_{max}$ of 592 nm with a half band width of 43 nm as measured with an UV-visible-near IR spectrophotometer V-570 (JASCO Corp.).
Formulation:

| | |
|---|---|
| Clay mineral complex 1 | 0.12 g |
| Acrylic pressure sensitive adhesive (DB Bond 5541, from Diabond) | 70 g |
| Methyl ethyl ketone | 30 g |

Example 2

Fabrication of Optical Filter 2

Optical filter 2 was fabricated in the same manner as in Example 1, except for replacing DB Bond 5541 with DX2-PDP-19 (from Nippon Shokubai Co., Ltd.) as an acrylic pressure sensitive adhesive and additionally using Coronate L-55E (from Nippon Polyurethane Industry Co., Ltd.) as a curing agent. The resulting optical filter had a $\lambda_{max}$ of 592 nm with a half band width of 43 nm as measured with an UV-visible-near IR spectrophotometer V-570 (JASCO Corp.).

Example 3

Fabrication of Optical Filter 3

Optical filter 3 was fabricated in the same manner as in Example 1, except for using 0.09 g of clay mineral complex 2 as a clay mineral complex. The resulting optical filter had a $\lambda_{max}$ of 592 nm with a half band width of 43 nm as measured with an UV-visible-near IR spectrophotometer V-570 (JASCO Corp.).

Evaluation Examples, Comparative Evaluation Examples, and Examples given above reveal the following facts.

In systems having a pressure sensitive adhesive according to the invention, the optical filters of Evaluation Examples 1 to 4 which contain the clay mineral complex of the invention are superior in resistance to 300-hour and 500-hour exposure to light, heat, and moist heat to those of Comparative Evaluation Examples 1 and 3 which contain a salt of a dye cation and an anion in place of the clay mineral complex and those of Comparative Evaluation Examples 2 and 4 which contain a mixture of a layered clay mineral and a salt of a dye cation and an anion in place of the clay mineral complex.

It has now been proved that the optical filter of the present invention that contains the clay mineral complex of the invention and the pressure sensitive adhesive of the invention exhibits light resistance withstanding practical use and is particularly superior in heat resistance and moist heat resistance.

Industrial Applicability

The optical filter of the present invention is superior in light resistance and moist heat resistance. The optical filter is suitable to improve display quality of image displays and to prevent reflection of ambient light.

The invention claimed is:

1. A method for producing an optical filter that comprises a clay mineral complex (A) and a binder resin (E), the method comprising:
    forming the clay mineral complex (A) by intercalating a layered clay mineral (B) with a dye cation (C) and an organic cation (D), the ratio of the dye cation (C) and the organic cation (D) to one part of the layered clay mineral (B) being 0.01 to 0.9 parts and 0.1 to 0.99 parts, respectively; and
    following the forming step, adding the formed clay mineral complex (A) to the binder resin (E) at a ratio of 0.0001 to 50 parts by mass of the clay mineral complex (A) with respect to 100 parts by mass of solid components in the binder resin (E); and
    wherein the layered clay mineral (B) is lipophilic smectite, the binder resin (E) is an acrylic pressure sensitive adhesive, and the dye cation (C) is selected from the group consisting of cation of a cyanine compound, and cation of a diimmonium compound.

2. The optical filter according to claim 1, wherein the dye cation (C) is a cation of a cyanine compound represented by general formula (I):

[Formula 1]

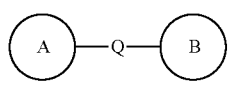

(I)

wherein ring A is a group represented by structural formula (a), (b), or (d); ring B is a group represented by structural formula (b) or (c); and Q is a polymethine linking group, the polymethine chain of which may contain a ring structure and may have its hydrogen atom substituted with a halogen atom, a cyano group, a hydroxyl group, an alkyl group, an alkoxy group, or an aryl group, these groups may be further substituted,

[Formula 2]

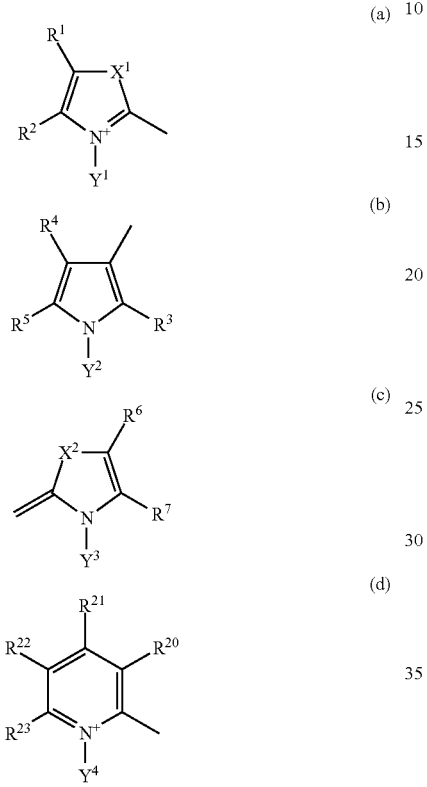

wherein $R^1$, $R^2$, $R^3$, $R^4$, $R^5$, $R^6$, $R^7$, $R^{20}$, $R^{21}$, $R^{22}$, and $R^{23}$ each represent a hydrogen atom, a hydroxyl group, a substituted or unsubstituted alkyl group having 1 to 8 carbon atoms, a substituted or unsubstituted alkoxy group having 1 to 8 carbon atoms, a substituted or unsubstituted aryl group having 6 to 30 carbon atoms, a substituted or unsubstituted aralkyl group having 7 to 30 carbon atoms, a halogen atom, a nitro group, a cyano group, or a substituent represented by general formula (II) below; $R^1$ and $R^2$, $R^4$ and $R^5$, $R^6$ and $R^7$, $R^{20}$ and $R^{21}$, $R^{21}$ and $R^{22}$, or $R^{22}$ and $R^{23}$ may be connected to each other to form a carbocyclic or heterocyclic ring having 3 to 12 carbon atoms; $X^1$ and $X^2$ each represent an oxygen atom, a sulfur atom, a selenium atom, —$CR^8R^9$—, —NH—, or —$NY^a$—; $R^8$ and $R^9$ each represent a substituted or unsubstituted alkyl group having 1 to 8 carbon atoms, a substituted or unsubstituted aryl group having 6 to 30 carbon atoms, a substituted or unsubstituted aralkyl group having 7 to 30 carbon atoms, a substituent represented by general formula (II) below, or a substituent represented by general formula (III) below; $Y^a$, $Y^1$, $Y^2$, $Y^3$, and $Y^4$ each represent a hydrogen atom, a substituted or unsubstituted alkyl group having 1 to 8 carbon atoms, a substituted or unsubstituted alkoxy group having 1 to 8 carbon atoms, a substituted or unsubstituted aryl group having 6 to 30 carbon atoms, a substituted or unsubstituted aralkyl group having 7 to 30 carbon atoms, or a substituent represented by general formula (II) below, wherein the methylene moiety of the alkyl group may be substituted with —O— or —CO—,

[Formula 3]

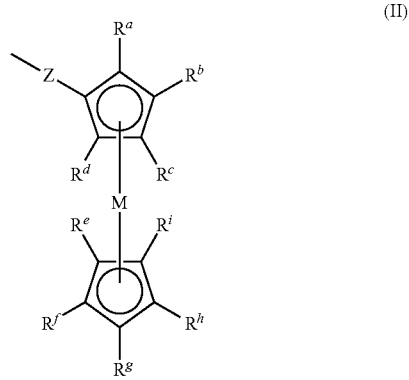

wherein $R^a$, $R^b$, $R^c$, $R^d$, $R^e$, $R^f$, $R^g$, $R^h$, and $R^i$ each represent a hydrogen atom, a hydroxyl group, or an alkyl group having 1 to 4 carbon atoms, wherein the alkylene moiety of which may be substituted with —O— or —CO—; Z represents a direct bond or a substituted or unsubstituted alkylene group having 1 to 8 carbon atoms, wherein the methylene moiety of which may be substituted with —O—, —S—, —CO—, —COO—, —OCO—, —SO$_2$—, —NH—, —CONH—, —NHCO—, —N=CH—, or —CH=CH—; and M represents a metal atom,

[Formula 4]

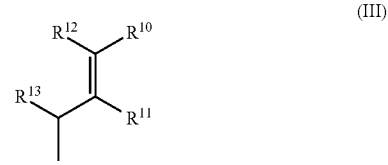

wherein $R^{10}$, $R^{11}$, $R^{12}$, and $R^{13}$ each represent a hydrogen atom, a halogen atom, a substituted or unsubstituted alkyl group having 1 to 4 carbon atoms, or a substituted or unsubstituted alkoxy group having 1 to 4 carbon atoms; and $R^{10}$ and $R^{11}$ may be connected to each other to form a carbocyclic or heterocyclic ring having 3 to 12 carbon atoms.

3. The optical filter according to claim 2, wherein the cation of the cyanine compound is represented by general formula (IV):

[Formula 5]

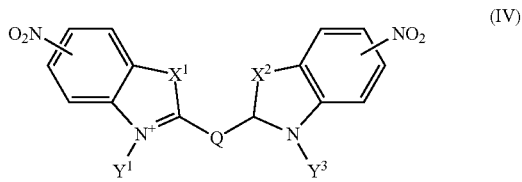

wherein Q, $Y^1$, $Y^3$, $X^1$, and $X^2$ are as defined for general formula (I).

4. The optical filter according to claim 1, wherein the dye cation (C) is a cation of a diimmonium compound represented by general formula (VI):

[Formula 6]

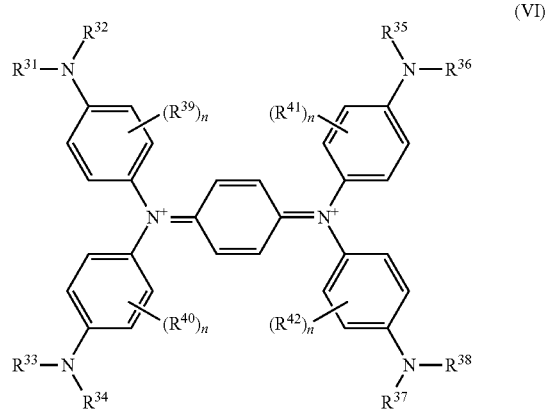

(VI)

wherein $R^{31}$, $R^{32}$, $R^{33}$, $R^{34}$, $R^{35}$, $R^{36}$, $R^{37}$, and $R^{38}$ each represent a hydrogen atom or a substituted or unsubstituted alkyl group having 1 to 8 carbon atoms; $R^{39}$, $R^{40}$, $R^{41}$, and $R^{42}$ each represent a hydrogen atom, a halogen atom, a substituted or unsubstituted alkyl group having 1 to 8 carbon atoms, or a substituted or unsubstituted amino group, wherein the methylene moiety of the alkyl group may be substituted with —O— or —CH=CH—; and n represents an integer of 1 to 4.

5. The optical filter according to claim 1, wherein the optical filter has a pressure sensitive adhesive layer, and the clay mineral complex (A) and the acrylic pressure sensitive adhesive are present in the pressure sensitive adhesive layer.

\* \* \* \* \*